United States Patent Office 3,390,961
Patented July 2, 1968

3,390,961
PURIFICATION OF TITANIUM DIOXIDE PIGMENT WITH ORGANIC SEQUESTERING AGENTS
George Leathwhite Roberts, Jr., and Walter Roye Whately, Lynchburg, Va., assignors to American Cyanamid Company, Stamford, Conn., a corporation of Maine
No Drawing. Filed May 20, 1965, Ser. No. 457,484
14 Claims. (Cl. 23—202)

The present invention relates to production of titanium dioxide pigments. It relates more particularly to the upgrading of titanium dioxide pigments by increasing the color stability of the pigments.

In the production of titanium dioxide pigments by the sulfate process, an accepted procedure for producing many pigments is to disperse the calcined pigment containing material in water; similarly, those pigments produced by the oxidation of titanium tetrachloride may also be dispersed. At this point, the pigment is classified by centrifugation to remove the particles larger than a particular size. After the pigment has been separated into desirable and undesirable particle size fractions, the desirable particles may be treated in an aqueous slurry by the addition of solutions of salts of polyvalent metals or other hydrous oxide producing materials such as titanium sulfate, titanium chloride, aluminum sulfate, aluminum chloride, sodium aluminate and sodium silicate.

Following the addition of these solutions to the pigment slurry, precipitation takes place and the hydrous oxides of the above mentioned polyvalent metals, known as finishing agents, may partly deposit upon the pigment surface or be precipitated in the vicinity of the pigment particles. This, in effect, imparts to the pigment special characteristics regarding texture, improved oil absorption and other special properties which render the pigment more suitable for use in several vehicle systems which may be employed. After the hydrous oxides have been precipitated, the pigment is then filtered, washed, dried and milled and is ready for use in a particular system.

In the past much research effort has been expended with the objective of improving pigment quality in many applications. However, through all the time and effort expended there has often been the problem of maintaining the color stability of the pigment in its final form in certain vehicle systems.

We have found through our research that one of the problems involving color stability arises through the fact that inevitably when the finishing agents are precipitated, color-forming metal impurities are also precipitated from the pigment slurry and said impurities may partly be deposited on the surface of the pigment. We believe that this is caused by the precipitation of the color-forming metal impurities from the slurry or the adsorption on the surface of the solid at approximately the same conditions of pH and temperature as those which are operative in the precipitation of the hydrous oxide finishing agents, namely, a pH of about 2 to 7.5 and a temperature of about 30° C. to 70° C., although in most cases the temperature does not appear to be critical. We have further found that these color-forming metal impurities almost always include iron and copper, and may include manganese and chromium. We have also found that color-forming metal impurities are introduced into a pigment system through a number of ways. Mainly the color-forming metal impurities may be associated with pigment in some salt or hydroxide form. The color-forming metal impurities themselves may come from the normal corrosion of upstream apparatus, from the starting materials, or from water used for slurrying purposes. In any event, they may be present in amounts capable of causing a reduction of color stability in the final pigment product.

With the above discoveries in mind, we have derived a solution to this heretofore unknown problem. The solution resides in the complexing of the color-forming metal impurities with a small amount of an organic sequestering agent. By doing this we have been able to selectively inhibit the precipitation or adsorption of the color-forming metal impurities onto or with the pigment when the hydrous oxide finishing agents are applied. The results derived from this method are better color stability in the final pigment product. Therefore, one principal feature of our invention resides in the precipitation or association of hydrous oxide finishing agents with the pigment in the presence of an organic sequestering agent where said sequestering agent will inhibit or reduce materially the precipitation or adsorption of the color-forming metal impurities that are inevitably present in the solution.

As we have mentioned above, the color-forming metal impurities are complexed with an organic sequestering agent. Even though there are a great number of organic sequestering agents that will complex iron, copper, chromium and manganese, we have found that some organic sequestering agents complex the aforementioned ions better than others in our particular system and therefore the former are used in systems revolving about the concept of our invention.

We have found that the following method is useful for determining whether a certain organic sequestering agent will improve the color stability of $TiO_2$ pigments. First, the organic sequestering agent should be able to form stable complexes with the color-forming metal impurities in question at a relatively high pH above 7, preferably about 7 to 11. Secondly, the complex that is formed from the organic sequestering agent and the color-forming metal impurity should be capable of remaining stable down to a pH of about 1 to 2. Therefore, we believe that the organic sequestering agent reacts with the desired metal impurity to an aqueous solution to reduce the concentration of the metal ion to an extent such that its hydroxide, hydrous oxide or other insoluble salt of the metal will not precipitate or be adsorbed on the surface of the pigment. For the purpose of this invention, it appears that the particular organic sequestering agent used can be characterized as one which forms a complex that is more stable than other compounds of the color-forming impurities which are insoluble or absorbed on the surface of the pigment.

There are a number of well-known complexing agents which will meet the requirements outlined above. Among these are diamine compounds such as tetramethylenediamine, N-ethylethylenediamine, N,N'-dimethylethylenediamine, N,N'-dimethylethylenediamine and ethylenediamine-tetraacetic acid; amino acids such as α-aminopropionic acid, α-amino-β-hydroxypropionic acid, aminosuccinic acid, and α-aminobutyric acid; diacetic acids such as iminodiacetic acid, N-(carbamoylmethyl)iminodiacetic acid, N-2-hydroxyethyliminodiacetic acid, and ethylenediamine-N,N-diacetic acid; imidazoles such as 5-methylimidazole, 4-ethylamine-5-methyl-imidazole and 5-alanineimidazole; aryl sulphonic acids such as 2-hydroxybenzenesulfonic acid, 3-carboxyl-4-hydroxybenzenesulfonic acid, phenylazo-6,10-naphthalenedisulfonic acid, and 4-(2-hydroxy-1-naphthylazo)benzenesulfonic acid. Other complexing agents, such as tartaric acid and oxalic acid, that also meet the requirements of the process of our invention can be found in the publication entitled "Stability Constants," Bjerrum, Schwarzenbach, and Sillen; Part I: Organic Ligands; London: The Chemical Society, Burlington House, W.1; 1957. While all of the above compounds and their alkali metal and ammonium salts are operative in the process of our invention, we have found that ethylenediaminetetraacetic acid and its salts [hereinafter referred to as EDTA] appear to be the most effective, and therefore the preferred specific embodiments of our invention to be recited below will reflect the use of an EDTA compound. However, it is to be understood that this is not to be considered a restriction of the broader aspects of our invention although it may constitute a specific feature thereof; the examples are presented as illustrative of the whole group of compounds that fit the criteria outlined above.

When $TiO_2$ pigments emerge from the calcination or oxidation treatments, it is standard procedure in the manufacture of many pigments to disperse them in water wherein they are classified by the use of a centrifugal classifier or similar means. After the classification of the pigments, various metal finishing agent producing materials such as titanium sulfate, aluminum sulfate, sodium silicate, sodium aluminate, titanium chloride or aluminum chloride are added to the pigment slurry. The hydrous oxides of the above polyvalent metals, known as finishing agents, in turn are precipitated in the presence of the pigment at a pH of about 2.0 to 7.5 and a temperature of about 30° C. to 70° C. After the addition of the finishing agent producing compounds, the pH of the slurry is so adjusted as to precipitate them by the addition of basic compounds such as sodium hydroxide and sodium carbonate, or acidic compounds such as hydrochloric acid or sulfuric acid. When the precipitation of the finishing agent is complete, the slurry is then neutralized and held at approximately 70° C. in order to age the hydrous oxides. Finally the slurry is filtered and washed in water at approximately 70° C. and the filter cake is dried at about 110° C. and milled in a fluid energy mill or similar means.

An important advantage of this invention resides in the fact that it is completely adaptable to the standard procedures of adding finishing agents to the pigment, in that the addition of organic sequestering agent and its operation in the system is not affected by the ranges of pH and the temperature in which the finishing operation takes place, nor does it markedly alter those conditions.

Another important advantage lies in the simplicity with which the concept of our invention may be carried out. Thus, the EDTA compound, or other polyvalent metal sequestering agent compound is merely added to the pigment slurry in amounts sufficient to inhibit the precipitation of color-forming metals during the subsequent end treatment. In particular, we have found that between about 0.05% and 2% of a sequestering agent such as an EDTA compound, based on the weight of the $TiO_2$ pigment, is sufficient to carry out the complexing reaction under the operating condition of ordinary commercial practice, and such amounts are hereinafter referred to as color-forming metal sequestering amounts. When this is done, the sequestering agent almost immediately forms very stable complexes with the color-forming metal impurities present in the slurry, and in turn inhibits their precipitation or adsorption.

The quantity of the organic sequestering agent used may be varied outside of the range given above. However, the effectiveness of the sequestering agent may be less when using a smaller quantity, while the use of larger quantities than those given in the indicated range may be uneconomical depending on overall circumstances of operation.

It should at this point be noted from the above discussion that, in essence, two distinct actions take place after the pigment has been slurried in water and an organic sequestering agent has been added. First, the color-forming metal impurities in the form of salts and hydroxides that may be already present on the pigment are at least partially dissolved when the pigment is slurried, and upon the addition of an organic sequestering agent these are complexed. Secondly, any color-forming metal impurities in the slurry water in which the pigment is slurried are also complexed by the addition of an EDTA compound or other organic sequestering agent. In addition, any color-forming metal impurities added with the treating solutions will similarly be complexed. All of the color-forming metal impurities so complexed by the organic sequestering agent will thus be inhibited from precipitation or adsorption whether they originated in the slurry water, on the pigment itself, or in the treating solution and whether or not any hydrous oxide finishing agents are added to the pigment slurry for end treatment of the pigment.

It will therefore be seen that the process of this invention in its broadest aspects comprises essentially a method of treating a finely divided $TiO_2$ pigment in an aqueous slurry contaminated with color-forming metal impurities wherein contamination or recontamination of the pigment is inhibited by the presence in the slurry water of an organic sequestering agent of the type described above. In a more practical and preferred aspect, this feature is applied during the precipitation of hydrous oxide finishing agents with said $TiO_2$ pigment where in the improvement comprises precipitating said hydrous oxide finishing agents from the aqueous slurry in the pH range of about 2 to 7.5 in the presence of any organic sequestering agent which inhibits precipitation or adsorption of color-forming metal impurities, but is preferably an ethylenediaminetetraacetic acid compound.

It will be clear from the foregoing that the principles of our invention may be applied in aqueous pigment systems, wherein no end treatment is contemplated, but rather the pigment after calcination is merely slurried in water followed by addition of an organic sequestering agent, such as an EDTA compound, in metal sequestering amounts. Any ionized color-forming metal impurities present will be complexed by the sequestering agent and thereafter may be removed from the system by washing them away, thereby removing any chance of their precipitation or adsorption back onto the pigment.

The invention will be further illustrated by the following specific examples. It should be understood, however, that while these examples may describe specific features of the invention, they are presented primarily for the purposes of illustration and the invention in its broader aspects is not limited thereto.

In the following examples, "Titanium Dioxide Property Specification TA-84" is referred to. This is a standard laboratory test used to determine the gloss and color stability of titanium dioxide in a metal coating enamel subjected to intensive heating.

Basically, the test is as follows: First, a composite of the following material is prepared:

81.0 grams of a resin composed of a 50% by weight solution of a dehydrated castor oil-phthalic anhydride resin in xylol.

4.6 grams of a resin composed of a 50% by weight solution of an alkylated urea formaldehyde resin in butanol-xylol mixture.

3.8 grams of a resin composed of 60% by weight solution of an alkylated melamine formaldehyde resin in butanol.

7.1 grams of Solvesso® 150, a hydrocarbon solvent, aromatic solvent ($C_9$ aromatics 1.3%, $C_{10}$ aromatics 44.4%, $C_{11}$ aromatics 25.3%, $C_{12}$ aromatics 2.1%, 17.7%, naphthalenes 6.5%).

2.9 grams of butanol.

Approximately 99.4 grams of the above composite is then combined with about 49.5 grams of the $TiO_2$ test sample along with 50 g. of a 20–30 mesh standard sand. Next, the sample is shaken for 20 minutes, after shaking the sand is allowed to settle out. Once the sand has been allowed to settle, the texture is measured using a .002 Hegman gauge in the customary manner. At this point the enamels produced are applied to aluminum panels and allowed to air dry for 20 minutes. Some of the panels thereafter are baked for 5 minutes at 450° F. (overbaked) while others are baked for 10 minutes at 275° F. (regular bake).

After baking the gloss is measured by the use of 60 degree Glossometer on all panels and color tone and color brightness are also measured. Finally, a Hunter Reflectometer is used to measure brightness and yellow factor.

The results of this type of test procedure are recorded where applicable in Tables 1 and 2 given below.

EXAMPLE 1

The following is an experiment carried out on a laboratory scale which demonstrates the overall improvement of gloss and color stability of the pigment treated with various amounts of an organic sequestering agent according to the principles of our invention. The untreated pigment feed in this example contained approximately 2.14 p.p.m. of copper.

10 kilograms of a hydroclassified slurry containing 20% by weight of rutile titanium dioxide was divided into four equal samples, each containing 500 g. of $TiO_2$. Varying amounts of disodium ethylenediaminetetraacetate are added to each of the slurries is indicated in Table 1, wherein said percentages are by weight, based on the dry weight of the $TiO_2$. All the slurries were then treated identically by adding 50 ml. of a titanic sulfate solution containing 100 g. per liter of $TiO_2$ and 100 ml. of an aluminum sulfate solution containing 100 g. per liter of $Al_2O_3$. The slurries were agitated 30 minutes and a solution of 300 g. per liter of sodium carbonate was added until the slurry reached a pH of 5.0. The temperature was kept constant at 30° C. A 10% solution of sodium hydroxide was added until the slurry reached a pH of 7.5. The neutralized slurry was heated to 70° C. and held at this temperature for four hours, to effectively complete hydrolysis, after which the slurries were filtered and washed with 5 liters of water at 70° C. The filter cakes were dried at 110° C. and milled in a fluid energy mill. Baking enamels were prepared using these pigments according to Titanium Dioxide Property Specification TA–84. These enamels were applied on aluminum sheets and cured. Hunter Reflectometer readings for these enamels are given in Table 1.

TABLE 1

| Sample | A | B | C | D |
|---|---|---|---|---|
| Disodium-ethylene-diaminetetraacetate, percent | None | 0.38 | 0.74 | 1.5 |
| Green Reflections | 80.6 | 80.8 | 81.1 | 84.0 |
| Amber Reflections | 83.1 | 83.7 | 83.3 | 84.0 |
| Blue Reflections | 70.6 | 71.3 | 71.7 | 76.9 |
| Yellow Factor (A–B) | 12.5 | 12.0 | 11.6 | 7.1 |
| Gloss | 55 | 65 | 66 | 67 |
| Cu Present, p.p.m | 2.14 | 1.5 | 0.8 | 0.6 |

The above figures demonstrate that the reflectivity and hiding power of the pigments were materially improved by the use of an organic sequesting agent, while the yellowing of the enamels was greatly reduced.

EXAMPLE 2

The following experiment is on a plant manufacturing scale, wherein the untreated pigment contains approximately 2.14 p.p.m. copper. In this case, 20 tons of calcined $TiO_2$ pigment were divided into equal portions. One portion was given no organic sequestering agent treatment, while the second portion was treated with specific amounts of tetrasodiumethylenediaminetetraacetate according to the procedures outlined in Example 1 and similarly tested. The results are reflected in Table 2.

TABLE 2

| Sample | A | B |
|---|---|---|
| Tetrasodium-ethylene-diaminetetraacetate, percent | None | 0.40 |
| Green Reflections | 82.8 | 83.7 |
| Amber Reflections | 84.7 | 85.4 |
| Blue Reflections | 75.4 | 76.5 |
| Yellow Factor (A–B) | 9.3 | 8.9 |
| Gloss | 65 | 67 |
| Cu Present, p.p.m | 2.14 | 0.83 |

The results of this experiment also demonstrate an increase in the reflectivity and hiding power of the pigments treated with the organic sequestering agent, while the yellowing of the enamels was greatly reduced.

EXAMPLE 3

The proceding examples were given to demonstrate the overall effect of a typical organic sequestering agent in the treatment of a $TiO_2$ pigment. The following example will show the effect of an organic sequestering agent on a particular color-forming metal impurity—namely copper—present on the pigment surface before treatment with the organic sequestering agent.

Six tons of a hydro classified slurry containing 25% by weight of a copper-contaminated rutile $TiO_2$ was treated with 0.4% by weight (based on $TiO_2$) with tetrasodiumethylenediaminetetraacetate (40% solution in $H_2O$). The slurry was agitated for one-half hour, then it was further treated by the addition of 1% hydrous titania (calculated as $TiO_2$) such as titanium sulfate solution (100 g. of $TiO_2$ per liter) and 2% hydrous alumina as alum (calculated as $Al_2O_3$). The slurry was then stirred for one-half hour at which time a solution of 300 g. per liter of sodium carbonate was added until pH 5.0 was reached. The temperature was kept at 30° C. and a 20% solution of sodium hydroxide was added until the slurry reached a pH of 7.5. The neutralized slurry was heated to 70° C. where it was agitated four hours in order to effectively complete the hydrolysis. At this point the slurry was filtered and washed in water at 60° C. and dried at 110° C. and finally milled in a fluid energy mill.

The results of this experiment showed that the copper content of the pigment, which before treatment with the organic sequestering agent had been approximately 2.14 parts per million, was reduced to 0.84 part per million.

EXAMPLE 4

This example is provided to demonstrate the applicability of the concept of this invention for the inhibiting of the precipitation of color-forming metal impurities onto a pigment surface in a system wherein no end treatment of the pigment is desired. The procedure here is the same as that in Example 3, however, no hydrous titania or hydrous alumina is added, and the pH of the pigment slurry is kept at approximately 6.5 to 7.5.

The results of the experiment showed that the copper content of the pigment, which before treatment with the organic sequestering agent had been approximately 2.14 parts per million, was reduced to 0.81 part per million.

We claim:
1. A method for improving the color of finely-divided $TiO_2$ pigment contaminated with color-forming impurities which comprises mixing the pigment with water and an organic sequestering agent to form an aqueous slurry containing color-forming impurities, said sequestering agent forming a complex with the color-forming impurities, said complex having greater stability than compounds of the color-forming impurities which are insoluble and adsorbable on the pigment, and recovering a $TiO_2$ pigment of improved color from said slurry.

2. The method of claim 1 wherein said sequestering agent is a water soluble organic diamine.

3. The method of claim 1 wherein said sequestering agent is an amino carboxylic acid.

4. The method of claim 1 wherein said sequestering agent is a tetraacetic acid compound.

5. The method of claim 1 wherein said sequestering agent is an aryl sulphonic acid.

6. The method of claim 4 wherein the sequestering agent is ethylene diamine tetraacetic acid.

7. The method of claim 4 wherein the sequestering agent is the alkali metal salt of ethylene diamine tetraacetic acid.

8. The method of claim 4 wherein the sequestering agent is an ammonium salt of ethylene diamine tetraacetic acid.

9. The method of claim 1 wherein the aqueous slurry is at a pH of 1 to 7.5.

10. The method of claim 4 wherein the aqueous slurry is at a pH of about 1 to 7.5.

11. The method of claim 4 wherein the $TiO_2$ pigment slurry is at a pH of about 6.5 to 7.5.

12. The method of claim 4 wherein the color-forming metal impurities include copper.

13. The method of claim 4 wherein the $TiO_2$ pigment is produced by the calcination of hydrous titania prepared from a sulfuric acid solution.

14. The method of claim 4 wherein the $TiO_2$ pigment is produced by the oxidation of titanium tetrachloride.

References Cited

UNITED STATES PATENTS

| | | | |
|---|---|---|---|
| 3,000,704 | 9/1961 | Stanley et al. | 23—202 |
| 3,063,807 | 11/1962 | Kenworthy | 23—202 |
| 3,178,264 | 4/1965 | Sheehan et al. | 23—202 |

OTHER REFERENCES

O. Samuelson's book: "Ion Exchange Separations in Analytical Chemistry," 1963 edition, pages 87, 88, 279, 333 and 390, John Wiley & Sons, New York, publishers.

OSCAR R. VERTIZ, *Primary Examiner.*

MAURICE A. BRINDISI, EDWARD STERN, MILTON WEISSMAN, *Examiners.*